(12) United States Patent
Yan et al.

(10) Patent No.: US 11,442,239 B2
(45) Date of Patent: Sep. 13, 2022

(54) ASSEMBLY DEVICE AND ASSEMBLY METHOD FOR OPTICAL ASSEMBLY

(71) Applicant: Ningbo Sunny Opotech Co., Ltd., Zhejiang (CN)

(72) Inventors: Chunqi Yan, Zhejiang (CN); Xiaoming Ding, Zhejiang (CN); Yiqi Wang, Zhejiang (CN); Hailong Liao, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 221 days.

(21) Appl. No.: 16/761,939

(22) PCT Filed: Aug. 23, 2018

(86) PCT No.: PCT/CN2018/101978
§ 371 (c)(1),
(2) Date: May 6, 2020

(87) PCT Pub. No.: WO2019/091186
PCT Pub. Date: May 16, 2019

(65) Prior Publication Data
US 2021/0149146 A1    May 20, 2021

(30) Foreign Application Priority Data
Nov. 13, 2017  (CN) .......................... 201711113852.1

(51) Int. Cl.
G02B 7/02      (2021.01)
G02B 27/62    (2006.01)
H04N 5/225    (2006.01)

(52) U.S. Cl.
CPC ............. G02B 7/023 (2013.01); G02B 7/021 (2013.01); G02B 27/62 (2013.01); H04N 5/2254 (2013.01)

(58) Field of Classification Search
CPC .......... G02B 27/62; G02B 7/02; G02B 7/021; G02B 7/023; H04N 5/2254; B23P 21/002; B23P 21/008
See application file for complete search history.

(56) References Cited

U.S. PATENT DOCUMENTS

| | | | | |
|---|---|---|---|---|
| 5,768,035 A | * | 6/1998 | Grassens | ................. G11B 7/22 359/822 |
| 8,786,713 B1 | * | 7/2014 | Tamasanis | ......... H04N 5/23287 348/340 |

(Continued)

FOREIGN PATENT DOCUMENTS

| | | |
|---|---|---|
| CN | 102873523 | 1/2013 |
| CN | 203083809 | 7/2013 |

(Continued)

OTHER PUBLICATIONS

International Search Report dated Oct. 22, 2018 in International (PCT) Application No. PCT/CN2018/101978.

*Primary Examiner* — Chiawei Chen
(74) *Attorney, Agent, or Firm* — Wenderoth. Lind & Ponack, L.L.P.

(57) ABSTRACT

An assembly device for an optical assembly comprises: a grasping mechanism (310) configured to grasp a first sub-lens to be assembled, and to move the grasped first sub-lens in multiple degrees of freedom; a first fixing mechanism (320) configured to fix a second sub-lens to be assembled, wherein the grasping mechanism (310) is movable relative to the first fixing mechanism (320), so that the first sub-lens and the second sub-lens form an optical system capable of imaging; a second fixing mechanism (330) configured to fix a photosensitive assembly; a data acquiring assembly (340) configured to be electrically connected to the photosensitive assembly fixed by the fixing mechanism (330) and acquire image data output by the photosensitive assembly; and a (Continued)

material connecting assembly (210) configured to fix the first and second sub-lenses together.

20 Claims, 8 Drawing Sheets

(56) References Cited

U.S. PATENT DOCUMENTS

| | | | |
|---|---|---|---|
| 9,766,473 B1* | 9/2017 | Tamasanis | G01B 5/14 |
| 2004/0020043 A1 | 2/2004 | Ueno et al. | |
| 2009/0033787 A1 | 2/2009 | Nishino et al. | |
| 2010/0103308 A1* | 4/2010 | Butterfield | H01L 27/14685 |
| | | | 348/340 |
| 2013/0047396 A1* | 2/2013 | Au | B23Q 17/22 |
| | | | 29/700 |
| 2013/0086802 A1 | 4/2013 | Wang | |
| 2014/0298642 A1* | 10/2014 | Sesti | B60R 11/04 |
| | | | 29/592.1 |
| 2017/0201744 A1* | 7/2017 | Wong | H04N 5/2354 |

FOREIGN PATENT DOCUMENTS

| | | |
|---|---|---|
| CN | 105721753 | 6/2016 |
| CN | 205614297 | 10/2016 |
| CN | 206544006 | 10/2017 |
| EP | 2 023 175 | 2/2009 |
| JP | 10-149545 | 6/1998 |
| JP | 2006-308987 | 11/2006 |
| KR | 10-0811781 | 3/2008 |
| KR | 10-2009-0013699 | 2/2009 |
| WO | 2015/060188 | 4/2015 |

\* cited by examiner

ASSEMBLY DEVICE AND ASSEMBLY METHOD FOR OPTICAL ASSEMBLY

CROSS-REFERENCE TO RELATED APPLICATIONS

This application claims the priority and benefit of Chinese Patent Application No. 201711113852.1, filed with the State Intellectual Property Office of China on Nov. 13, 2017, the disclosure of which is incorporated entirely herein by reference.

TECHNICAL FIELD

The present application relates to field of optical technology, and in particular, the present application relates to an assembly device and an assembly method for optical assembly.

BACKGROUND TECHNIQUE

With popularity of mobile electronic devices, related technologies of camera modules for facilitating users to obtain images (such as videos or images) applied to the mobile electronic devices have been rapidly developed and progressed. In recent years, camera modules have been widely applied in many fields such as medical treatment, security, industrial production and so on.

In order to meet the growing market demands, currently the irreversible development trends of the camera modules will be of high pixel, small size, and large aperture. At present, the market proposes increasing demands for imaging quality of the camera modules. Factors affecting the resolution of a camera module with a given optical design include quality of optical imaging lens, and manufacturing errors during module packaging process.

Specifically, in manufacturing process of the optical imaging lens, factors affecting the resolution of the lens come from errors of each element and its assembly, errors of thickness of lens spacer element, errors of the assembly and matching of each lens, and changes in refractive index of lens material. Among them, the errors of each element and its assembly include errors such as optical surface thickness of each lens element, sagittal height of an optical surface of a lens, shape of the optical surface, radius of curvature, eccentricity of a single side of a lens and the eccentricity between the optical surfaces of a lens, and an inclination of the optical surface of a lens. The magnitude of these errors depends on the ability to control mold accuracy and molding accuracy. The error of the thickness of the lens spacer element depends on processing accuracy of the element. The error of the assembly and matching of each lens depends on dimensional tolerance of the element to be assembled and the assembly accuracy of the lens. The error caused by change in the refractive index of the lens material depends on stability of the material and batch consistency.

There is a phenomenon of cumulative deterioration of the errors affecting the resolution for each of the above elements, and this cumulative error is increasing with increase of number of lenses. Existing resolution solutions are to control the dimensional tolerance and rotation of the lens of each element with relatively high sensitivity, to compensate to improve the resolution. However, because lenses with high pixels and large apertures are more sensitive, the tolerance requirement is strict, for example, 1 μm of the eccentricity for some sensitive lenses will bring 9' image plane inclination, and make the lens processing and assembly more and more difficult. At the same time, because of a long feedback cycle in the assembly process, a process capability index (CPK) of the lens assembly is low, and fluctuation is large, resulting in a highly defective rate. As mentioned above, since there are many factors affecting the resolution of a lens, and they exist in multiple elements, and control of each factor has a limit of manufacturing accuracy. If only the accuracy of each element is simply improved, capacity of improvement is limited with high cost, and it cannot meet the increasing demand for imaging quality in the market.

On the other hand, during the processing of a camera module, the assembly process of various structural components (such as mounting of a sensor chip, a process of locking a motor lens, etc.) may cause inclination of the sensor chip, and multiple inclinations may be superimposed; as a result, the resolution of an imaging module cannot reach established specifications, thereby leading to a low yield of the module factory. In recent years, the module factories have compensated for the inclination of the photosensitive chip through an active calibration process when assembling the imaging lens and the photosensitive module. However, this process has limited compensation capabilities. Since various aberrations affecting the resolution come from ability of optical system (especially the optical imaging lens) itself, when the resolution of the optical imaging lens itself is insufficient, the existing active calibration process of the photosensitive module is difficult to compensate.

CONTENTS OF THE INVENTION

The object of present invention is to provide technical solutions capable of overcoming at least one of the above disadvantages in the conventional solution.

According to one aspect of the present invention, provided is an assembly device for an optical assembly, including: a grasping mechanism, configured to grasp a first sub-lens to be assembled, and configured to move the grasped first sub-lens in multiple degrees of freedom; a first fixing mechanism, configured to fix a second sub-lens to be assembled, wherein the grasping mechanism is movable relative to the first fixing mechanism, so that the first sub-lens and the second sub-lens form an optical system capable of imaging; a second fixing mechanism, configured to fix a photosensitive assembly; a data acquiring assembly, configured to be electrically connected to the photosensitive assembly fixed by the fixing mechanism and acquire image data output by the photosensitive assembly; and a material connecting assembly, configured to fix the first and second sub-lenses together.

Wherein, the assembly device further includes: a light source assembly, configured to provide a light source and an object-side target for the optical system capable of imaging.

Wherein, the grasping mechanism is configured to grasp the first sub-lens by contacting the outside surface of the first sub-lens.

Wherein, the second fixing mechanism is configured to fix a photosensitive assembly for testing.

Wherein, the second fixing mechanism is configured to fix a photosensitive assembly to be assembled, and the material connecting assembly is further configured to fix the second sub-lens and the photosensitive assembly together.

Wherein, the second fixing mechanism has an adsorption hole, and the bottom surface of the photosensitive assembly is configured to be arranged on the adsorption hole.

Wherein, the grasping mechanism includes a grasping unit and an adjustment mechanism for multiple degrees of freedom, and the grasping unit is mounted on the adjustment mechanism for multiple degrees of freedom.

Wherein, the grasping unit includes a clamp. The clamp includes two clamping arms, and the two clamping arms may be close to each other or away from each other, thereby clamping or releasing a clamped object.

Wherein, the clamp includes a force feedback clamping jaw and a proportional valve for controlling the pressure of the force feedback clamping jaw in real time.

Wherein, the force feedback clamping jaw is a gas claw or an electric claw.

Wherein, the grasping unit includes an adsorption unit.

Wherein, the grasping mechanism has a first reference plane, and the adjustment mechanism for multiple degrees of freedom has multiple degrees of freedom, including the degrees of freedom in x, y, z, r, v, or w directions, wherein the x-direction and the y-direction are two mutually perpendicular directions of a rectangular coordinate system on the first reference plane, the z-direction is perpendicular to the first reference plane, the r-direction is a rotation direction rotating around a rotation axis parallel to the z-direction, the v-direction is a rotation direction rotating on a xoz plane, and the w-direction is a rotation direction rotating on a yoz plane.

Wherein, the assembly device further includes a switch assembly, configured to move the light source assembly and the material connecting assembly to or out of a working position corresponding to the first fixing mechanism.

Wherein, the material connecting assembly includes a glue applying sub-assembly and a curing sub-assembly.

Wherein, the material connecting assembly includes a material welding assembly.

Wherein, the light source assembly includes a zoomable light source assembly.

Wherein, the zoomable light source assembly includes a parallel light pipe.

Wherein, the light source assembly includes a plurality of parallel light pipes configured to align with a light incident surface of the first sub-lens from different directions.

Wherein, the light source assembly includes a fixed-focus light source assembly, and the second fixing mechanism is further configured to move in the optical axis direction of the optical system.

Wherein, the fixed-focus light source assembly includes a mark plate.

Wherein, the assembly device further includes a position measuring assembly, configured to measure an initial position of the first sub-lens for the grasping mechanism to grasp the first sub-lens.

Wherein, the position measuring assembly includes a photographing assembly, configured to be arranged on the optical axis of the optical system and photograph the first sub-lens, and calculate a center position of the sub-lens based on the captured image.

Wherein, the position measuring assembly further includes a ranging assembly, configured to measure the height of the first sub-lens in a direction along the optical axis of the optical system.

Wherein, the second fixing mechanism has a second reference plane, and the second fixing mechanism further includes an inclination angle adjusting mechanism, which is configured to adjust the second fixing mechanism in the degree of freedom in the v-direction and w-direction, so that the second reference plane matches the first reference plane.

Wherein, the position measuring assembly is further configured to measure a second reference plane of the second fixing mechanism, and the inclination angle adjusting mechanism is configured to adjust the second fixing mechanism based on the measurement result of the position measuring assembly, so that the second reference plane matches the first reference plane.

Wherein, the first fixing mechanism has a third reference plane, and the first fixing mechanism further includes an inclination angle adjusting mechanism, which is configured to adjust the first fixing mechanism in the degree of freedom in the v-direction and w-direction, so that the third reference plane matches the first reference plane.

Wherein, the first fixing mechanism further includes a rotation adjusting mechanism, configured to rotate the first fixing mechanism in a direction rotating about a rotation axis perpendicular to the third reference plane.

Wherein, the data acquiring assembly includes: an adapter plate, fixed to the second fixing mechanism and electrically connected to the photosensitive assembly; a data acquiring box, configured to acquire and process image data; and a connecting strip, of which one end is electrically connected to the adapter board, and the other end is electrically connected to the data acquiring box.

Wherein, the assembly device further includes a vibration isolation platform, and the fixing mechanism, the grasping mechanism, the light source assembly, and the material connecting assembly are all mounted on the vibration isolation platform.

According to another aspect of the present invention, also provided is a method for assembling an optical lens based on the above assembly device for an optical assembly, which includes the following steps:

fixing the second sub-lens to the first fixing mechanism;

grasping the first sub-lens and arranging the first sub-lens on the optical axis of the second sub-lens by the grasping mechanism, so as to form the optical system capable of imaging;

changing the relative positions of the first and second sub-lenses, measuring the imaging quality of the optical system at different relative positions, and finding the relative positions of the first and second sub-lenses that make the imaging quality reach a threshold, wherein the imaging quality of the optical system is obtained on the basis of the image data acquired by the data acquiring assembly, and the image data acquired by the data acquiring assembly is from the photosensitive assembly fixed to the second fixing mechanism; and maintaining the relative positions of the first and second sub-lenses that make the imaging quality reach a threshold, and utilizing the material connecting assembly to fix the first and second sub-lenses together.

Wherein, prior to the step of finding the relative positions of the first and second sub-lenses that make the imaging quality reach a threshold, utilizing the material connecting assembly to apply glue on the first sub-lens and/or the second sub-lens;

after the step of finding the relative positions of the first and second sub-lenses that make the imaging quality reach a threshold, maintaining the relative positions of the first and second sub-lenses that make the imaging quality reach a threshold, and utilizing the material connecting assembly to fix the first and second sub-lenses together.

Wherein, after the step of finding the relative positions of the first and second sub-lenses that make the imaging quality reach a threshold, separating the first sub-lens from the second sub-lens, utilizing the material connecting assembly to provide glue on the first sub-lens and/or the second sub-lens, then re-arranging the first sub-lens on the optical axis of the second sub-lens, maintaining the relative positions of the first and second sub-lenses that make the imaging quality reach a threshold, and utilizing the material connecting assembly to fix the first and second sub-lenses together.

Wherein, in the step of finding the relative positions of the first and second sub-lenses that make the imaging quality reach a threshold, taking measures to counteract sub-lens position shift caused by expansion or contraction of the glue during the curing process; the curing process may be implemented as curing means such as exposure, heating, humidity change, and vibration.

Wherein, the grasping mechanism has a force feedback clamping jaw;

in the step of finding the relative positions of the first and second sub-lenses that make the imaging quality reach a threshold, the force feedback clamping jaw grips the first sub-lens with a first pressure; in the step of utilizing the material connecting assembly to fix the first and second sub-lenses together, the force feedback clamping jaw grips the first sub-lens with a second pressure; and the second pressure is greater than the first pressure.

According to another aspect of the present invention, also provided is a method for assembling a camera module based on the above assembly device for an optical assembly, which includes the following steps:

fixing the second sub-lens to the first fixing mechanism; fixing the photosensitive assembly to be assembled to the second fixing mechanism;

grasping the first sub-lens and arranging the first sub-lens on the optical axis of the second sub-lens by the grasping mechanism, so as to form the optical system capable of imaging;

changing the relative positions of the first sub-lens, the second sub-lens, and the photosensitive assembly to be assembled, and measuring the imaging quality of the optical system at different relative positions, then finding the relative positions of the first and second sub-lenses, and the relative positions of the second sub-lens and the photosensitive assembly to be assembled that make the imaging quality reach a threshold, wherein the imaging quality of the optical system is obtained on the basis of the image data acquired by the data acquiring assembly, and the image data acquired by the data acquiring assembly is from the photosensitive assembly to be assembled; and maintaining the relative positions of the first and second sub-lenses that make the imaging quality reach a threshold, and utilizing the material connecting assembly to fix the first and second sub-lenses together; maintaining the relative positions of the second sub-lens and the photosensitive assembly to be assembled that make the imaging quality reach a threshold, and utilizing the material connecting assembly to fix the second sub-lens and the photosensitive assembly to be assembled together.

Wherein, prior to the step of finding the relative positions of the first and second sub-lenses, and the relative positions of the second sub-lens and the photosensitive assembly to be assembled that make the imaging quality reach a threshold, utilizing the material connecting assembly to apply glue on the first sub-lens and/or the second sub-lens, and apply glue on the second sub-lens and/or the photosensitive assembly to be assembled;

after the step of finding the relative positions of the first and second sub-lenses, and the relative positions of the second sub-lens and the photosensitive assembly to be assembled that make the imaging quality reach a threshold, maintaining the relative positions of the first and second sub-lenses that make the imaging quality reach a threshold, and utilizing the material connecting assembly to cure the glue and fix the first and second sub-lenses together, and fix the second sub-lens and the photosensitive assembly to be assembled together.

Wherein, after the step of finding the relative positions of the first and second sub-lenses, and the relative positions of the second sub-lens and the photosensitive assembly to be assembled that make the imaging quality reach a threshold, separating the first sub-lens from the second sub-lens, and separating the second sub-lens from the photosensitive assembly to be assembled; utilizing the material connecting assembly to apply glue on the first sub-lens and/or the second sub-lens, and apply glue on the second sub-lens and/or the photosensitive assembly to be assembled; then re-arranging the first sub-lens on the optical axis of the second sub-lens, and maintaining the relative positions of the first and second sub-lenses, and the relative positions of the second sub-lens and the photosensitive assembly to be assembled that make the imaging quality reach a threshold, and utilizing the material connecting assembly to cure the glue and fix the first and second sub-lenses together, and fix the second sub-lens and the photosensitive assembly to be assembled together.

Wherein, in the step of finding the relative positions of the first and second sub-lenses that make the imaging quality reach a threshold, taking measures to counteract sub-lens position shift caused by expansion or contraction of the glue during the curing process; the curing process may be implemented as curing means such as exposure, heating, humidity change, and vibration.

Wherein, the grasping mechanism has a force feedback clamping jaw;

in the step of finding the relative positions of the first and second sub-lenses that make the imaging quality reach a threshold, the force feedback clamping jaw grips the first sub-lens with a first pressure; in the step of utilizing the material connecting assembly to fix the first and second sub-lenses together, the force feedback clamping jaw grips the first sub-lens with a second pressure when curing the glue; and the second pressure is greater than the first pressure.

Compared with the conventional solution, the solution of the present invention has at least one of the following technical effects:

1. The device of the invention can improve the process capability index (CPK) of mass-produced optical lenses or camera modules.

2. The invention enables to loosen the requirements for the accuracy of the various elements of the materials (such as the sub-lenses or photosensitive assembly used to assemble the optical lens or camera module) and their assembly accuracy, thereby reducing the overall cost of the optical imaging lens and the camera module.

3. The invention can adjust various aberrations of the camera module in real time during the assembly process, thereby reducing the defective rate and production cost, and improving the imaging quality.

4. The present invention realizes the one-time aberration adjustment of the entire module by adjusting the relative positions of the first sub-lens and the second sub-assembly in multiple degrees of freedom, thereby improving the overall imaging quality of the module.

5. In the present invention, the pressure applied to the sub-lens is controlled in real time by the feedback clamping jaw, so as to avoid the degradation of the imaging quality of the optical imaging lens or the camera module caused by the deformation of the lens or the lens barrel.

6. The invention can inhibit the pulling force of the glue on the material during the curing process, thereby further improving the imaging quality of the optical imaging lens or the camera module.

BRIEF DESCRIPTION OF THE DRAWINGS

Exemplary embodiments are shown in reference drawings. The embodiments and figures disclosed herein are to be regarded as illustrative rather than restrictive.

SPECIFIC EMBODIMENTS

Figure 1:
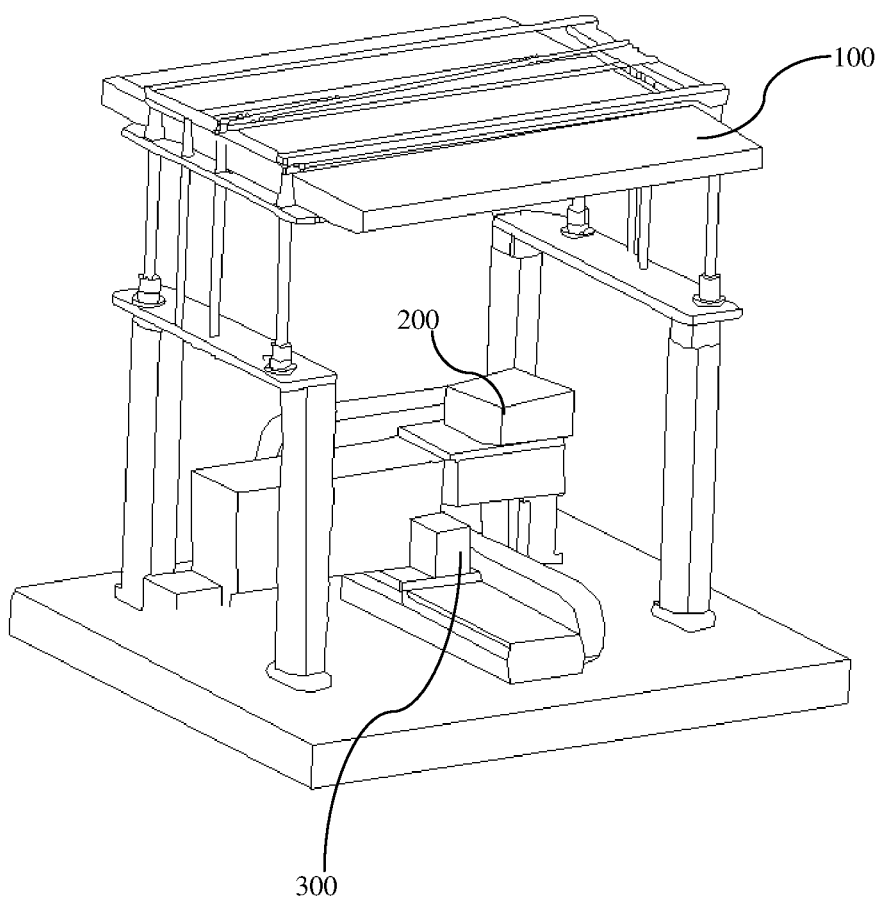
FIG. 1 is a schematic perspective view of an assembly device for an optical assembly according to an embodiment of the present invention.

In order to better understand the present application, various aspects of the present application will be described in more detail with reference to the accompanying drawings. It should be understood that these detailed descriptions are merely descriptions of exemplary embodiments of the present application, and do not limit the scope of the present application in any way. Throughout the description, the same reference numerals refer to the same elements. The expression "and/or" includes any and all combinations of one or more of the associated and listed items.

It should be noted that in this specification, the expressions of "the/a first", "the/a second", etc. are only used to distinguish one feature from another feature, and do not indicate any limitation on the features. Therefore, without departing from the teachings of this application, the first subject discussed below may also be referred to as the second subject.

In the drawings, for convenience of explanation, the thickness, size, and shape of the object have been slightly exaggerated. The drawings are only illustrative examples and are not strictly drawn to scale.

It should also be understood that, as used herein, the terms "including", "comprising", "have/has", "include" and/or "comprise" indicate existence of the stated features, wholeness, steps, operations, elements and/or components, but do not exclude the presence or addition of one or more other features, wholeness, steps, operations, elements, components and/or combinations thereof. Furthermore, when an expression such as "at least one of" appears prior to the list of listed features, the entire listed features are modified, rather than the individual elements in the list. In addition, when describing embodiments of the present application, "may" is used to mean "one or more embodiments of the present application." Also, the term "exemplary" is intended to refer to an example or illustration.

As used herein, the terms "substantially", "approximately", and similar terms are used to indicate approximations, not to indicate the degree, and they are intended to illustrate the inherent deviation of a measured value or a calculated value, which will be recognized by a person skilled in the art.

Unless otherwise defined, all terms (including technical and scientific terms) used herein have the same meaning as commonly understood by those skilled in the art to which this application belongs. It should also be understood that, terms (e.g. those defined in commonly used dictionaries) should be interpreted to have a meaning consistent with their meaning in the context of the relevant technology, and will not be interpreted in an idealized or overly formal sense, unless this is clearly defined in this article.

It should be noted that, in the case of no conflict, the embodiments in the present application and the features thereof may be combined with each other. The application will be described in detail below with reference to the drawings and embodiments.

The invention provides an assembly device for an optical assembly. The device may assemble two or more materials to be assembled into an optical assembly capable of imaging. The optical assembly may be an optical lens, or a camera module. The material to be assembled includes at least two sub-lenses. In some embodiments, the material to be assembled further includes a photosensitive assembly.

Figure 2:
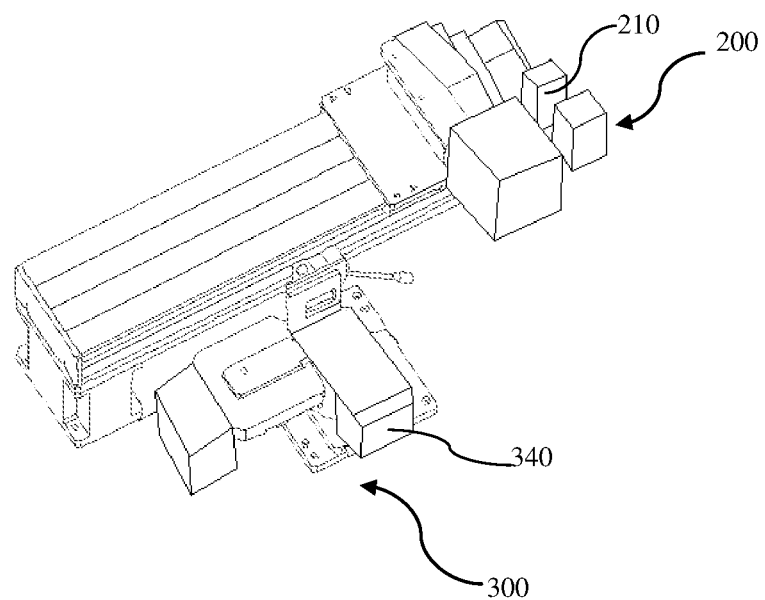
FIG. 2 shows a schematic perspective view concealing a light source assembly and some other components.

FIG. 1 is a schematic perspective view of an assembly device for an optical assembly according to an embodiment of the present invention. Referring to FIG. 1, the assembly device includes a light source assembly 100, a first assembly set 200, and a second assembly set 300. Further, FIG. 2 shows a schematic perspective view concealing a light source assembly and some other components, and the first assembly set 200 and the second assembly set 300 may be more clearly shown in the figure. When assembling an optical lens or a camera module, each material to be assembled is placed in the second assembly set 300 to form an optical system capable of imaging. Then, with the assistance of the light source assembly 100 and the second assembly set 300, the assembly of the optical lens or camera module is completed in an active calibration manner.

Figure 3:
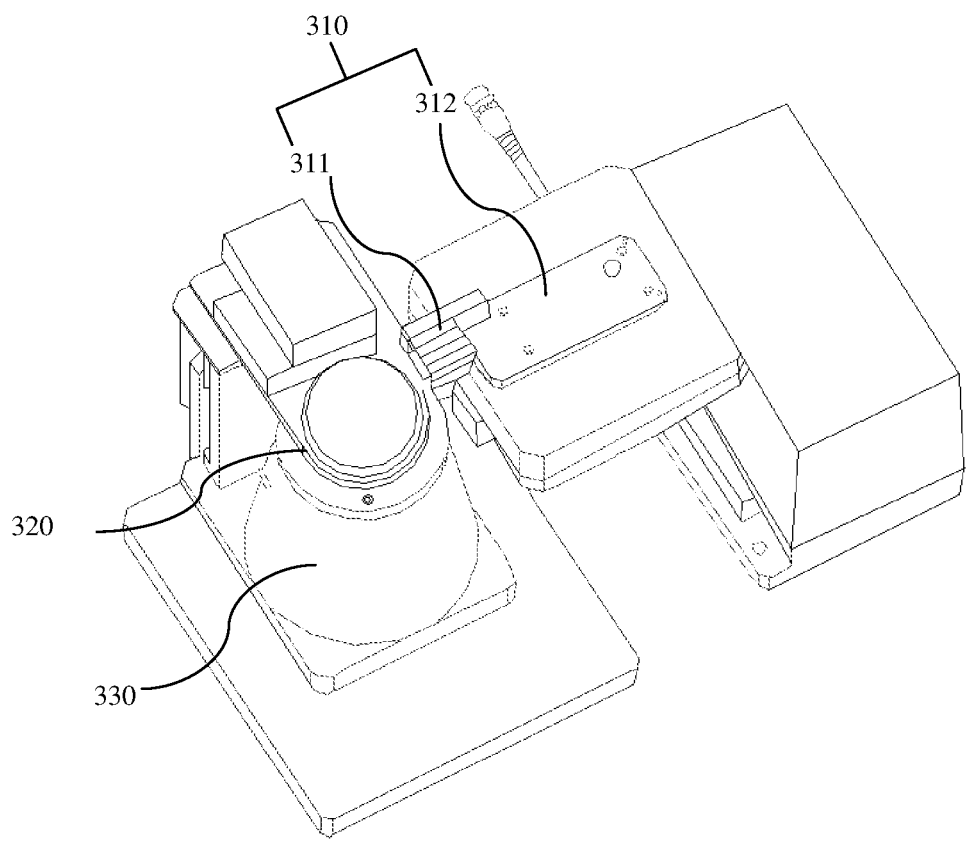
FIG. 3 is a schematic perspective view showing relative positions of a grasping mechanism, a first fixing mechanism, and a second fixing mechanism, when a first sub-lens, a second sub-lens, and a photosensitive assembly are arranged on a same optical axis to form an optical system capable of imaging.
Figure 4:
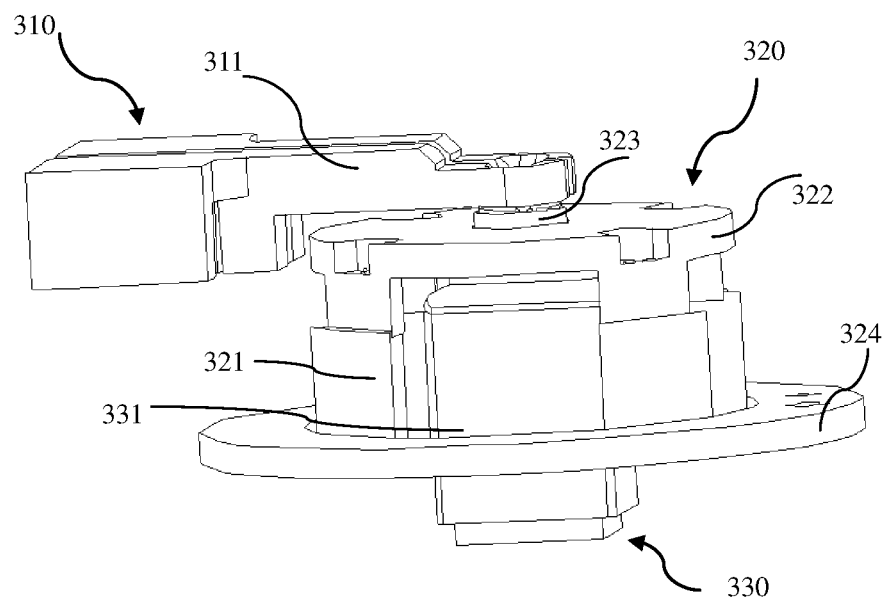
FIG. 4 is a schematic perspective view showing a partial structure of the grasping mechanism, the first fixing mechanism, and the second fixing mechanism in FIG. 3.
Figure 5:
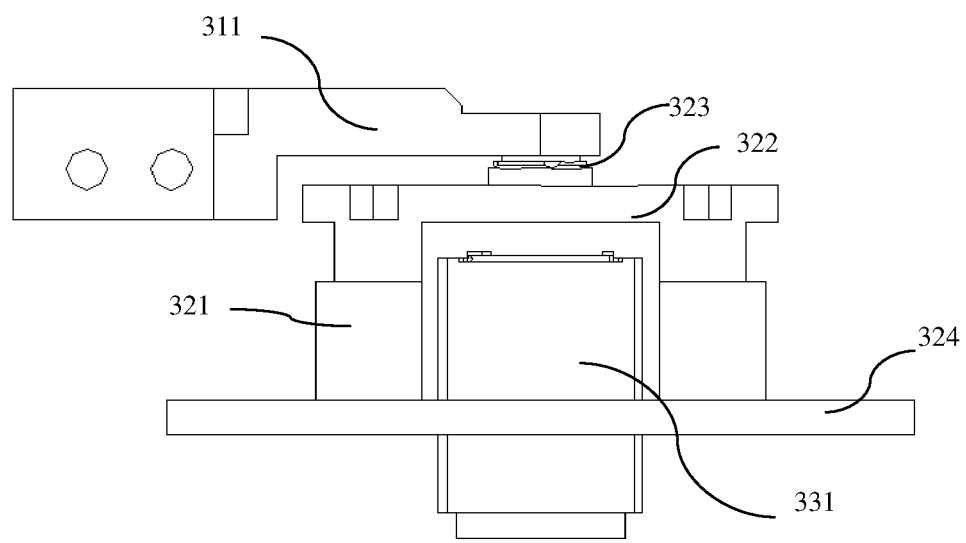
FIG. 5 is a schematic side view of the grasping mechanism, the first fixing mechanism, and the second fixing mechanism shown in FIG. 4.

FIG. 3 is a schematic perspective view showing relative positions of a grasping mechanism, a first fixing mechanism, and a second fixing mechanism, when a first sub-lens, a second sub-lens, and a photosensitive assembly are arranged on a same optical axis to form an optical system capable of imaging. Further, FIG. 4 is a schematic perspective view showing a partial structure of the grasping mechanism, the first fixing mechanism, and the second fixing mechanism in FIG. 3; FIG. 5 is a schematic side view of the grasping mechanism, the first fixing mechanism, and the second fixing mechanism shown in FIG. 4. Referring to FIGS. 3-5, the second assembly set 300 includes a grasping mechanism 310, a first fixing mechanism 320, and a second fixing mechanism 330. The grasping mechanism 310 is configured to grasp a first sub-lens to be assembled, and is configured to move the grasped first sub-lens in multiple degrees of freedom. The first fixing mechanism 320 is configured to fix a second sub-lens to be assembled to the first fixing mechanism 320. The second fixing mechanism 330 is configured to fix a photosensitive assembly to the second fixing mechanism 330. The photosensitive assembly herein may be a photosensitive assembly used only for testing, or a photosensitive assembly as a material to be assembled. In the following, a series of embodiments will be used to further explain various implementation manners of the grasping mechanism 310, the first fixing mechanism 320, and the second fixing mechanism 330.

Figure 6:
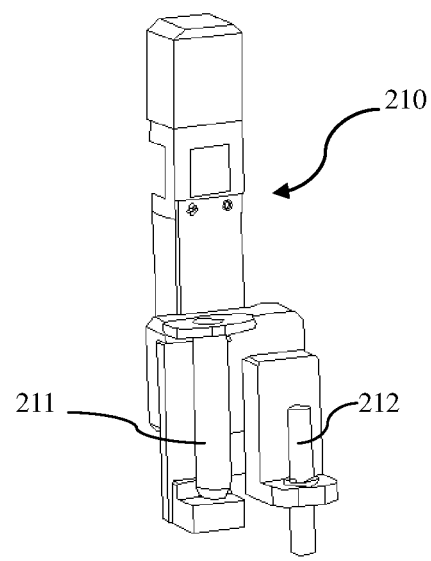
FIG. 6 shows a material connecting assembly according to an embodiment of the invention.

Further, the first assembly set 200 includes a material connecting assembly 210, which is configured to fix the first and second sub-lenses together. FIG. 6 shows a material connecting assembly according to an embodiment of the invention, the material connecting assembly includes a glue applying sub-assembly 211 and a curing sub-assembly 212. By utilizing the glue applying sub-assembly 211 and the curing sub-assembly 212, the glue may be applied between the first sub-lens and the second sub-lens to fix them together. When the photosensitive assembly is a photosensitive assembly of the material to be assembled, the material connecting assembly may further apply glue between the second sub-lens and the photosensitive assembly to fix them together.

The light source assembly 100 is configured to provide a light source and an object-side target for an optical system capable of imaging including the first sub-lens and the second sub-lens. Referring to FIG. 1, in an embodiment, the first assembly set 200 and the second assembly set 300 are respectively installed on mutually perpendicular rails, so as to adjust the relative positions of the first assembly set 200 and the second assembly set 300. Moving the second assembly set 300 along the rail allows the light source assembly 100 to be arranged above the second assembly set 300. When the grasping mechanism 310 and the first fixing mechanism 320 respectively grasp or fix the materials to be assembled (the first sub-lens or the second sub-lens), the light source assembly 100 is arranged above the optical system capable of imaging including the first sub-lens and the second sub-lens, so as to provide a light source and an object-side target for the optical system.

Further, in one embodiment, the assembly device further includes a data acquiring assembly 340, which is configured to be electrically connected to the photosensitive assembly fixed by the second fixing mechanism 330 and acquire image data output by the photosensitive assembly. Based on the image data, imaging quality in a current state of the optical system (for example, a resolution in the current state of the optical system capable of imaging including the first sub-lens and the second sub-lens) may be analyzed; the positions of one or more of the above grasping mechanism 310, the first fixing mechanism 320, and the second fixing mechanism 330 may be adjusted on the basis of the imaging quality, and then the relative positions of the first sub-lens and the second sub-lens is adjusted or the relative positions of the first sub-lens, the second sub-lens, and the photosensitive assembly is adjusted, thereby making the imaging quality of the optical system reach the design index.

Figure 7:
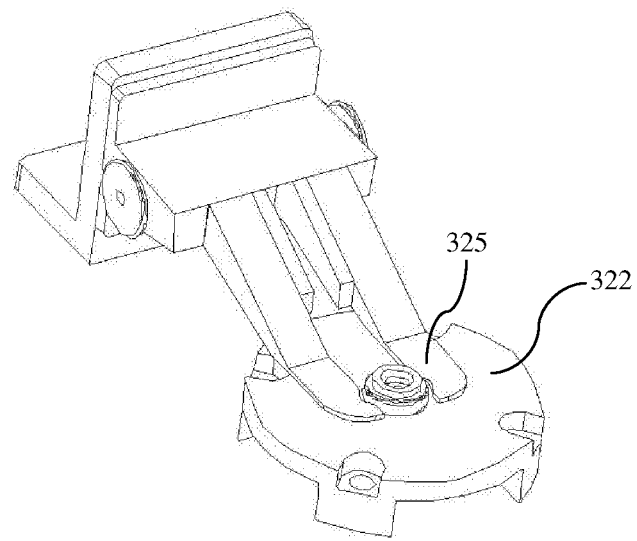
FIG. 7 shows a first fixing mechanism with a clamp according to an embodiment of the present invention.

Still referring to FIGS. 3 to 5, in one embodiment, the grasping mechanism 310, the first fixing mechanism 320, and the second fixing mechanism 330 may arrange the first sub-lens, the second sub-lens, and the photosensitive assembly on a same optical axis to form the optical system capable of imaging described above. The grasping mechanism 310 includes a clamp 311, which is configured to clamp and move the first sub-lens by contacting the outside surface of the first sub-lens. The first fixing mechanism 320 includes a first bracket 321 and a first stage 322 provided on the first bracket 321. The first stage 322 has an adapting structure 323 configured to mount the second sub-lens. The adapting structure 323 may be a screw structure; in this way, the second sub-lens with external threads on the lens barrel may be fixed on the first stage 322 by screw connection. The first bracket 321 is mounted on a first bottom plate 324 having a through-hole. The second fixing mechanism 330 includes a second stage 331, which is cylindrical and passes through the through-hole of the first bottom plate 324, so that the upper surface of the second stage 331 is close to the first stage 322. The second stage 331 has an adsorption hole, and the bottom surface of the photosensitive assembly is configured to be arranged on the adsorption hole, so that the photosensitive assembly may be fixed on the second fixing mechanism 330 by means of vacuum suction. It should be noted that, the combination manner of the grasping mechanism 310, the first fixing mechanism 320, and the second fixing mechanism 330 in the above embodiment is not unique. For example, in another embodiment, the adapting structure 323 for fixing the first stage 322 of the second sub-lens may be replaced by a clamp. FIG. 7 shows a first fixing mechanism with a clamp according to an embodiment of the present invention. The first fixing mechanism includes a clamp 325, and the second sub-lens may be arranged on the first stage 322 by using the clamp 325.

Figure 8:
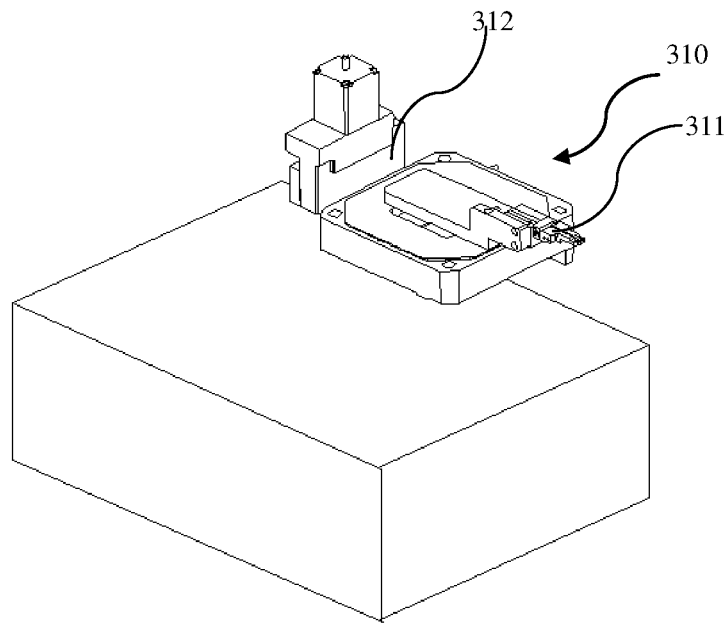
FIG. 8 shows a grasping mechanism according to an embodiment of the present invention.

Further, FIG. 8 shows a grasping mechanism according to an embodiment of the present invention. The grasping mechanism 310 includes a clamp 311 and an adjustment mechanism for multiple degrees of freedom 312, wherein the clamp 311 is mounted on the adjustment mechanism for multiple degrees of freedom 312. The clamp includes two clamping arms, and the two clamping arms may be close to each other or away from each other, thereby clamping or releasing the clamped object. The clamp includes a force feedback clamping jaw and a proportional valve for controlling the pressure of the force feedback clamping jaw in real time. Through the proportional valve and force feedback clamping jaw, the pressure of the clamping jaw on the sub-lens may be maintained in a preset range, so that the lens inside the sub-lens may be prevented from being deformed due to excessive side pressure. There are several ways to implement the force feedback clamping jaws. For example, in one embodiment, the force feedback clamping jaw is a gas claw. In another embodiment, the force feedback clamping jaw is an electric jaw.

The clamp may be replaced by other grasping units. For example, in another embodiment, the clamp may be replaced by an adsorption unit. The adsorption unit comprises a bowl-shaped adsorption nozzle and a vacuum cavity connected to the adsorption nozzle. The bowl-shaped nozzle contacts the top of the sub-lens, and the sub-lens may be adsorbed through the vacuum cavity. The top surface of the adsorption unit is made of a transparent material, so that the incident light emitted from the light source assembly 100 may pass through the top surface.

Figure 9:
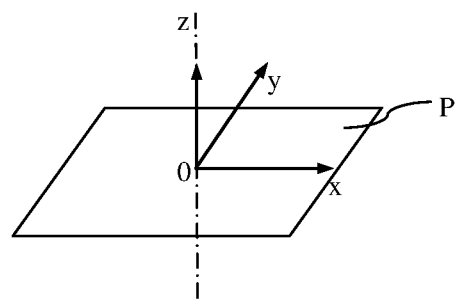
FIGS. 9-11 show degrees of freedom in x, y, z, r, v, or w direction according to one embodiment of the present invention.
Figure 10:
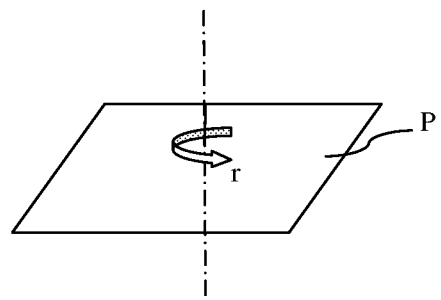
Figure 11:
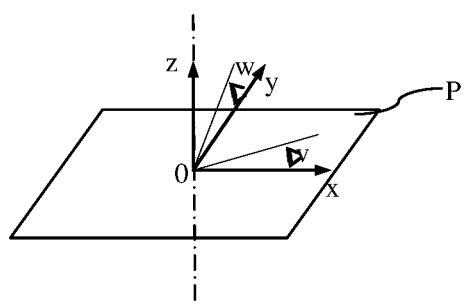

Still referring to FIG. 8, in one embodiment, the grasping mechanism 310 has a first reference plane, and the adjustment mechanism for multiple degrees of freedom 312 has multiple degrees of freedom, including the degrees of freedom in x, y, z, r, v, or w directions. FIGS. 9-11 show the degrees of freedom in x, y, z, r, v, and w directions according to one embodiment of the present invention. Referring to FIGS. 9-11, the x-direction and the y-direction are two mutually perpendicular directions in a rectangular coordinate system on the first reference plane P, the z-direction is a direction perpendicular to the first reference plane P, the r-direction is a rotation direction rotating around a rotation axis parallel to the z-direction, the v-direction is a rotation direction rotating on a xoz plane, and the w-direction is a rotation direction rotating on a yoz plane.

The assembly device of the above embodiment is particularly suitable for producing a camera module or an optical lens having characteristics such as high pixels, small size, and large aperture, and the produced camera module or optical lens is particularly suitable for a terminal device such as a smart phone.

In one embodiment, the material connecting assembly may be a material welding assembly, such as a laser welding assembly, or an ultrasonic welding assembly.

Figure 14:
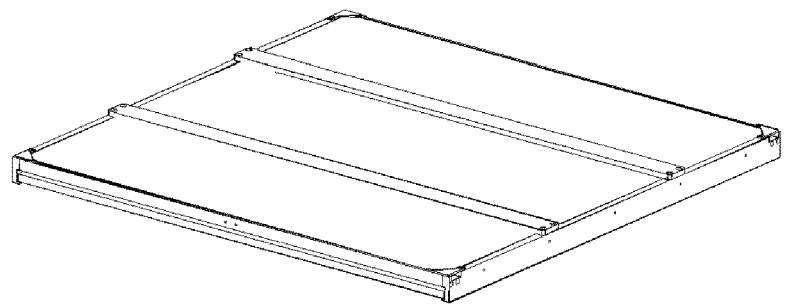
FIG. 14 shows an example of a mark plate.

In one embodiment, the light source assembly 100 includes a fixed-focus light source assembly, and the second stage 331 of the second fixing mechanism 330 is further configured to move in the direction of the optical axis of the optical system in order to measure a resolution defocus curve of the optical system. The fixed-focus light source assembly includes a mark plate. FIG. 14 shows an example of a mark plate.

In another embodiment, the light source assembly 100 is a zoomable light source assembly, wherein the zoomable light source assembly includes parallel light pipes. In one example, the light source assembly 100 includes a plurality of parallel light pipes configured to align with the light incident surface of the first sub-lens from different directions. With the parallel light pipes, the resolution defocus curve of the optical system may be measured.

Figure 12:
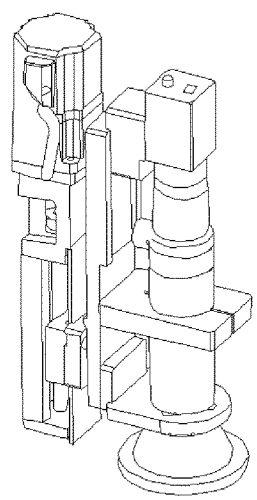
FIG. 12 shows an example of a photographing assembly.
Figure 13:
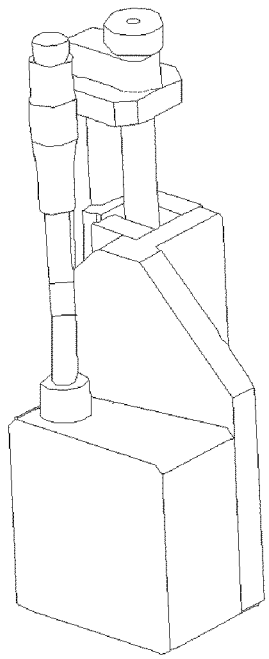
FIG. 13 shows an example of a laser ranging assembly.

In one embodiment, the first assembly set 200 of the assembly device further includes a position measuring assembly, which is configured to measure an initial position of the first sub-lens so that the clamp 310 grasps the first sub-lens. The position measuring assembly includes a photographing assembly 220, which is configured to be disposed above the first sub-lens and photograph the first sub-lens, and calculate a center position of the sub-lens based on a captured image. FIG. 12 shows an example of a photographing assembly. The position measuring assembly further includes a ranging assembly 230, which is configured to measure a height of the first sub-lens in a direction along the optical axis of the optical system. The ranging assembly may be a laser ranging assembly. FIG. 13 shows an example of a laser ranging assembly.

In one embodiment, the photographing assembly 220, the ranging assembly 230, and the material connecting assembly 210 are all installed in the first assembly set 200. The assembly device further includes a switch assembly, which is configured to move each assembly (e.g., the material connecting assembly 210, the photographing assembly 220, and the ranging assembly 230) located in the first assembly set 200 to or out of a working position corresponding to the first fixing mechanism 320 (or the second assembly set 300).

In one embodiment, the second fixing mechanism 330 has a second reference plane. The second fixing mechanism 330 further includes an inclination angle adjusting mechanism, which is configured to adjust the second fixing mechanism 330 in the degrees of freedom in the v-direction and the w-direction, so as to match the second reference plane with the first reference plane. The position measuring assembly is further configured to measure a second reference plane of the second fixing mechanism 330, and the inclination angle adjusting mechanism is configured to adjust the second fixing mechanism 330 based on the measurement result of the position measuring assembly, so as to match the second reference plane with the first reference plane.

In one embodiment, the first fixing mechanism 320 has a third reference plane; and the first fixing mechanism 320 further includes an inclination angle adjusting mechanism, which is configured to adjust the first fixing mechanism 320 in degrees of freedom in the v-direction and the w-direction, so as to match the third reference plane with the first reference plane.

In one embodiment, the first fixing mechanism 320 further includes a rotation adjusting mechanism, which is configured to rotate the first fixing mechanism 320 in a direction rotating about a rotation axis perpendicular to the third reference plane.

In one embodiment, the second fixing mechanism 340 includes an adapter plate, a data acquiring box, and a connecting strip. The adapter plate is fixed to the second fixing mechanism 330 and is electrically connected to the photosensitive assembly. The data acquiring box is configured to acquire and process image data. One end of the connecting strip is electrically connected to the adapter board, and the other end is electrically connected to the data acquiring box.

In one embodiment, the assembly device further includes a vibration isolation platform, and each of the first fixing mechanism 320, the second fixing mechanism 330, the grasping mechanism 310, the light source assembly 100, and the material connecting assembly that are located in the first assembly set is mounted on the vibration isolation platform.

Figure 15:
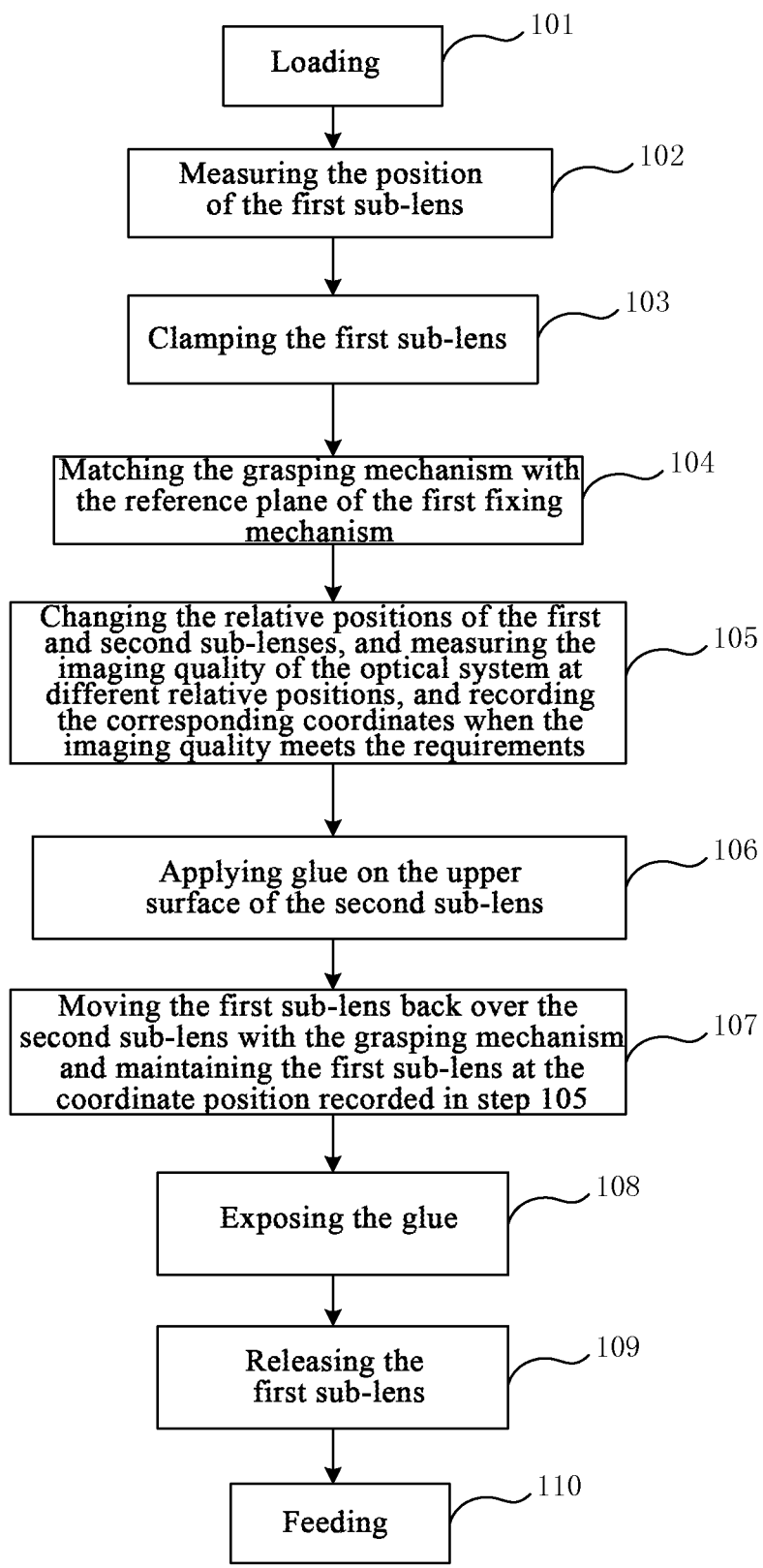
FIG. 15 shows a flowchart of a method for assembling an optical lens according to an embodiment of the present invention.

Further, according to an embodiment of the present invention, also provided is a method for assembling an optical lens based on the above assembly device. FIG. 15 shows a flowchart of a method for assembling an optical lens, including the following steps.

Step 101: loading. The first sub-lens and the second sub-lens are placed on the first stage of the first fixing mechanism. In this embodiment, the second sub-lens may be fixed on the first stage. The first sub-lens and the second sub-lens are not yet connected as a whole at this time, and the first sub-lens may be stacked on the second sub-lens at the time of loading. In addition, the photosensitive module for testing is mounted on the second stage of the second fixing mechanism.

Step 102: measuring a position of the first sub-lens. For example, the position of the first sub-lens in the x, y, and z directions is measured by using the photographing assembly and the laser ranging assembly.

Step 103: clamping the first sub-lens. According to the obtained position of the first sub-lens, the first sub-lens is clamped by the clamp of the grasping unit.

Step 104: matching the grasping mechanism with the reference plane of the first fixing mechanism. In one embodiment, a height of an upper surface of the second sub-lens is measured with the laser ranging assembly (for example, the height of each position on the upper surface of the lens of the second sub-lens is measured). By moving the grasping mechanism, the first sub-lens is arranged on the optical axis of the optical system. Then, the height of the upper surface of the first sub-lens is measured with the laser ranging assembly (for example, the height of each position on the upper surface of the lens of the first sub-lens is measured). In this way, the initial postures of the first and second sub-lenses are obtained. When the initial postures of the two do not match, the adjustment of one or two of the grasping mechanism or the first fixing mechanism in the w and v directions may be performed to match them. In one example, if the reference planes of the grasping mechanism and the first fixing mechanism are parallel, the initial postures of the first sub-lens and the second sub-lens are considered to be matched.

Step 105: moving the first sub-lens with the grasping mechanism to change the relative positions of the first and second sub-lenses, and measuring the imaging quality of the optical system at different relative positions. When the imaging quality meets the requirements, the coordinates of the grasping mechanism at various degrees of freedom are recorded at this time. In one embodiment, the light source assembly is arranged above the first assembly set to provide a light source and a target for the optical system capable of imaging including the first sub-lens and the second sub-lens, and the captured image data is output from the photosensitive assembly for testing. Based on the captured image data, a resolution defocus curve is obtained; and then based on the resolution defocus curve, it is determined whether the imaging quality of the optical system at the current position meets the requirements (that is, the performance is confirmed). When the imaging quality meets the requirements, the coordinates of the degrees of freedom in x, y, z, r, v, and w direction for the grasping mechanism at this time are recorded.

Step 106: applying glue on the upper surface of the second sub-lens. In one embodiment, the first sub-lens is removed with a grasping mechanism, and then the glue applying assembly is moved above the second sub-lens, and then the glue is applied to the upper surface of the lens barrel of the second sub-lens.

Step 107: moving the first sub-lens back over the second sub-lens with the grasping mechanism, and keeping the first sub-lens at the coordinate position recorded in step 105.

Step 108: curing the glue. In one embodiment, the curing assembly is moved to the working position, and then the glue between the first sub-lens and the second sub-lens is cured. For example, the glue is cured by exposing it.

Step 109: releasing the first sub-lens by the grasping mechanism. After the glue is cured, the first sub-lens and the second sub-lens are bonded together. At this time, the first sub-lens may be released.

Step 110: feeding. By this time, an optical lens is completely assembled. The optical lens is removed from the first stage to start the assembly of the next optical lens.

In the above embodiment, the position where the imaging quality meets the requirements is obtained through active calibration, and then the glue is applied. In another embodiment, the glue may also be applied first, and then active calibration is performed. In this embodiment, step 106 is performed before step 105, and step 107 is cancelled.

In a preferred embodiment, the grasping mechanism has a force feedback clamping jaw. In step 105, the force feedback clamping jaw clamps the first sub-lens with a first pressure; in step 108, the force feedback clamping jaw clamps the first sub-lens with a second pressure when curing the glue, wherein the second pressure is greater than the first pressure. Due to the shrinkage of the glue during the curing process, the first sub-lens will be pulled downward (toward the second sub-lens); if the force feedback clamping jaw exerts more pressure on the first sub-lens, it is helpful to suppress or counteract the above downward pull force, so that the assembled optical lens retains excellent imaging quality.

In other embodiments of the present invention, other measures may also be adopted to counteract the sub-lens position shift caused by the shrinkage of the glue during the curing process. For example, in one embodiment, a position feedback clamping jaw may be used to adjust the position of the clamping jaw by sensing the position change of the lens in real time, so as to prevent the sub-lens position shift caused by the shrinkage of the glue during the curing process. For another example, in another embodiment, the sub-lens position shift caused by the entire curing process is estimated in advance according to the curing expansion and contraction ratio of the glue material; before the beginning of the curing process, the estimated position shift is superimposed on the coordinate position recorded in step 105. In this way, during the curing process, the expansion and contraction characteristics of the glue material cause the sub-lens to reach a predetermined position, that is, the coordinate position recorded in step 105.

Figure 16:
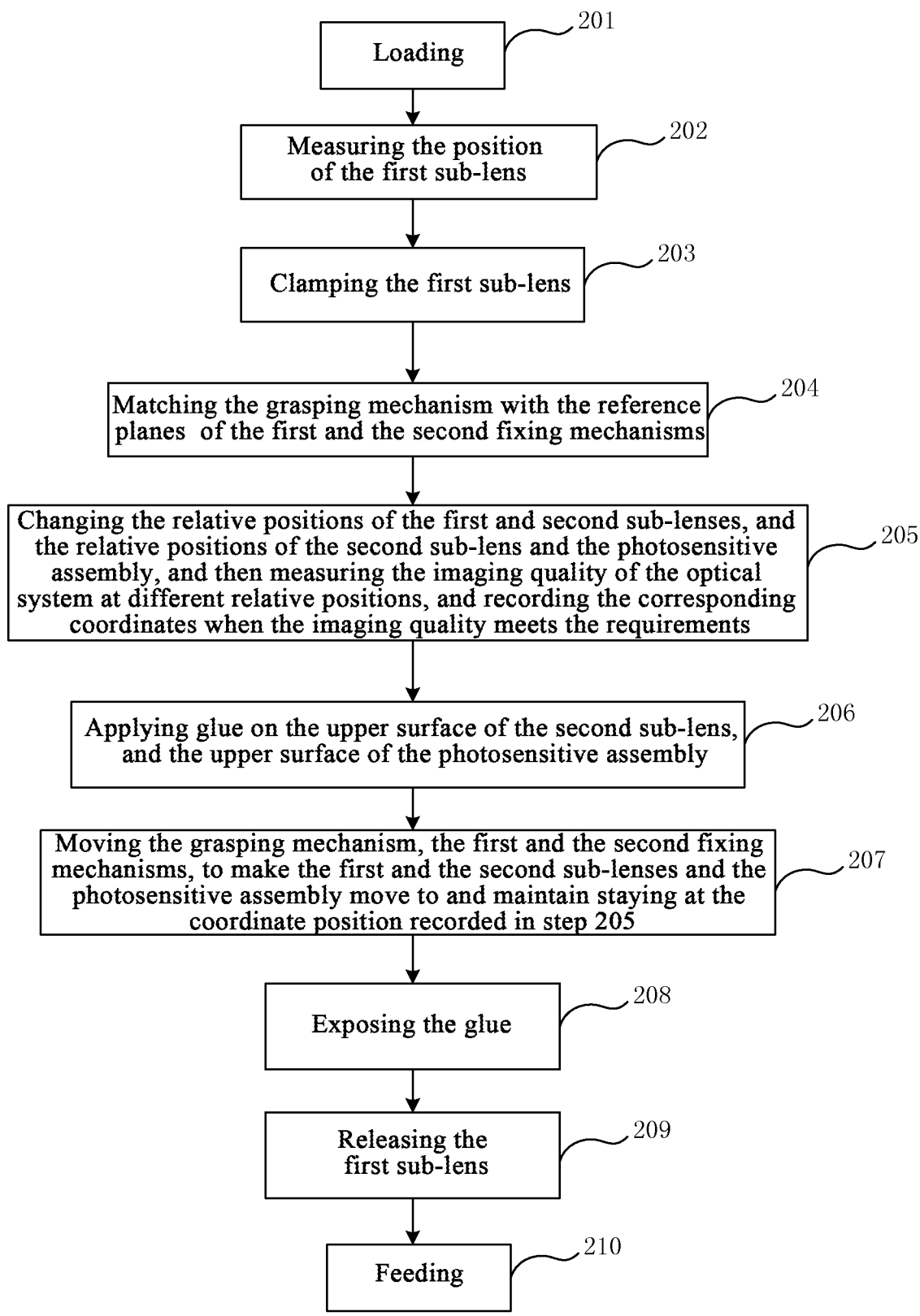
FIG. 16 shows a flowchart of a method for assembling a camera module according to an embodiment of the present invention.

Further, according to an embodiment of the present invention, also provided is a method for assembling a camera module based on the above assembly device. FIG. 16 shows a flowchart of the method for assembling a camera module, including the following steps.

Step 201: loading. The first sub-lens and the second sub-lens are placed on the first stage of the first fixing mechanism. The photosensitive module to be assembled is mounted on the second stage of the second fixing mechanism. The second sub-lens may be fixed on the first stage. The first sub-lens and the second sub-lens are not yet connected at this time. In this embodiment, the first sub-lens may be stacked on the second sub-lens at the time of loading.

Step 202: measuring the position of the first sub-lens. For example, the position of the first sub-lens in the x, y, and z directions is measured by using the photographing assembly and the laser ranging assembly.

Step 203: clamping the first sub-lens. According to the obtained position of the first sub-lens, the first sub-lens is clamped by the clamp of the grasping unit.

Step 204: matching the grasping mechanism with the reference plane of the first fixing mechanism. In one embodiment, a height of an upper surface of the second sub-lens is measured with the laser ranging assembly (for example, the height of each position on the upper surface of the lens of the second sub-lens is measured). By moving the grasping mechanism, the first sub-lens is arranged on the optical axis of the optical system. Then, a height of an upper surface of the first sub-lens is measured with the laser ranging assembly (for example, the height of each position on the upper surface of the lens of the first sub-lens is measured). In this way, the initial postures of the first and second sub-lenses are obtained. When the initial postures of the two do not match, the adjustment of one or two of the grasping mechanism or the first fixing mechanism in the w and v directions may be performed to match them. In one example, if the reference planes of the grasping mechanism and the first fixing mechanism are parallel, the initial postures of the first sub-lens and the second sub-lens are considered to be matched. Further, the initial posture of the photosensitive assembly may also be matched by adjustment in the w and v directions.

Step 205: moving the first sub-lens with the grasping mechanism, moving the second sub-lens with the first fixing mechanism, and moving the photosensitive assembly with the second fixing mechanism, so as to change the relative positions of the first and second sub-lenses, and the relative positions of the second sub-lens and the photosensitive assembly; and measuring the imaging quality of the optical system at different relative positions. When the imaging quality meets the requirements, the coordinates of the grasping mechanism, the first fixing mechanism, and the second fixing mechanism at various degrees of freedom are recorded at this time. In one embodiment, the light source assembly is arranged above the first assembly set to provide a light source and a target for the optical system capable of imaging including the first sub-lens and the second sub-lens, and the captured image data is output from the photosensitive assembly for testing. Based on the captured image data, a resolution defocus curve is obtained; and then based on the resolution defocus curve, it is determined whether the imaging quality of the optical system at the current position meets the requirements (that is, performance is confirmed). When the imaging quality meets the requirements, the coordinates of the degrees of freedom in x, y, z, r, v, and w directions for the grasping mechanism, the first fixed mechanism, and the second fixed mechanism at this time are recorded.

Step 206: applying glue on the upper surfaces of the second sub-lens and the photosensitive assembly. In one embodiment, the first sub-lens is removed with a grasping mechanism firstly, and then the glue applying assembly is moved above the second sub-lens, and then the glue is applied to the upper surface of the lens barrel of the second sub-lens. The second sub-lens is removed, and then the glue is applied to the upper surface of an annular support portion of the photosensitive assembly.

Step 207: moving the second sub-lens back over the photosensitive assembly, and keeping the second sub-lens at the coordinate position recorded in step 205. The first sub-lens is moved back above the second sub-lens by the grasping mechanism, and the first sub-lens is maintained at the coordinate position recorded in step 205.

Step 208: curing the glue. In one embodiment, the curing assembly is moved to the working position, and then the glue between the first sub-lens and the second sub-lens is cured. The glue between the second sub-lens and the photosensitive assembly is cured, for example, by exposing the glue.

Step 209: releasing the first sub-lens by the grasping mechanism. After the glue is cured, the first sub-lens, the second sub-lens and the photosensitive assembly are bonded together to form a camera module. At this time, the first sub-lens may be released.

Step 210: feeding. By this time, a camera module is completely assembled. The camera module is removed to start the assembling of the next camera module.

In the above embodiment, the position where the imaging quality meets the requirements is obtained through active calibration, and then the glue is applied. In another embodiment, the glue may also be applied first, and then active calibration is performed. In this embodiment, step 206 is performed before step 205, and step 207 is cancelled.

In a preferred embodiment, the grasping mechanism has a force feedback clamping jaw. In step 205, the force feedback clamping jaw clamps the first sub-lens with a first pressure; in step 208, the force feedback clamping jaw clamps the first sub-lens with a second pressure when curing the glue, wherein the second pressure is greater than the first pressure. Due to the shrinkage of the glue during the curing process, the first sub-lens will be pulled downward (toward the second sub-lens); if the force feedback clamping jaw exerts more pressure on the first sub-lens, it is helpful to suppress or counteract the above downward pull force, so that the assembled camera module retains excellent imaging quality.

In other embodiments of the present invention, other measures may also be adopted to counteract the sub-lens position shift caused by the expansion or contraction of the glue during the curing process. For example, in one embodiment, a position feedback clamping jaw may be used to adjust the position of the clamping jaw through photographing of the position change of the lens in real-time, so as to prevent the sub-lens position shift caused by the shrinkage of the glue during the curing process. For another example, in another embodiment, the sub-lens position shift caused by the entire curing process is estimated in advance according to the expansion and contraction ratio of the glue material; before the beginning of the curing process, the estimated position shift is superimposed on the coordinate position recorded in step 105. In this way, during the curing process, the expansion and contraction characteristics of the glue material cause the sub-lens to reach a predetermined position, that is, the coordinate position recorded in step 105.

The above description is only the preferred embodiment of the present application and the explanation of the applied technical principles. Those skilled in the art should understand that the scope of the invention involved in this application is not limited to the technical solutions of the specific combination of the above technical features, but also covers other technical solutions formed by any combinations of the above technical features or the equivalents thereof without departing from the inventive concept. For example, a technical solution may be formed by replacing the above features with technical features disclosed in the present application (but not limited to) having similar functions.

The invention claimed is:

1. An assembly device for an optical assembly, the assembly device comprising:
a grasping mechanism, configured to grasp a first sub-lens to be assembled, and to move the grasped first sub-lens in multiple degrees of freedom;
a first fixing mechanism, configured to fix a second sub-lens to be assembled, wherein the grasping mechanism is movable relative to the first fixing mechanism, so that the first sub-lens and the second sub-lens form an optical system capable of imaging;
a second fixing mechanism, configured to fix a photosensitive assembly;
a data acquiring assembly, configured to be electrically connected to the photosensitive assembly fixed by the second fixing mechanism and acquire image data output by the photosensitive assembly; and
a material connecting assembly, configured to fix the first and second sub-lenses together.

2. The assembly device for an optical assembly according to claim 1, wherein the second fixing mechanism is configured to fix the photosensitive assembly to be assembled, and the material connecting assembly is further configured to fix the second sub-lens and the photosensitive assembly together.

3. The assembly device for an optical assembly according to claim 2, wherein the grasping mechanism is configured to grasp the first sub-lens by contacting an outside surface of the first sub-lens, and the second fixing mechanism has an adsorption hole, and a bottom surface of the photosensitive assembly is configured to be arranged on the adsorption hole.

4. The assembly device for an optical assembly according to claim 1, wherein the grasping mechanism includes a grasping unit and an adjustment mechanism for multiple degrees of freedom, and the grasping unit is mounted on the adjustment mechanism for multiple degrees of freedom.

5. The assembly device for an optical assembly according to claim 4,
- wherein the grasping mechanism has a first reference plane, and the adjustment mechanism for multiple degrees of freedom has multiple degrees of freedom, including degrees of freedom in x, y, z, r, v, or w directions, and
- wherein the x-direction and the y-direction are two mutually perpendicular directions of a rectangular coordinate system on the first reference plane, the z-direction is perpendicular to the first reference plane, the r-direction is a rotation direction rotating around a rotation axis parallel to the z-direction, the v-direction is a rotation direction rotating on a xoz plane, and the w-direction is a rotation direction rotating on a yoz plane.

6. The assembly device for an optical assembly according to claim 5, further comprising a position measuring assembly, configured to measure an initial position of the first sub-lens, so that the grasping mechanism grasps the first sub-lens.

7. The assembly device for an optical assembly according to claim 6,
- wherein the position measuring assembly includes a photographing assembly, configured to be arranged on an optical axis of the optical system and photograph the first sub-lens to capture an image, and calculate a radial position of the first sub-lens based on the captured image, and
- wherein the radial position is a position of the first sub-lens on a plane perpendicular to the optical axis of the optical system.

8. The assembly device for an optical assembly according to claim 6, wherein the position measuring assembly includes a ranging assembly, configured to measure a height of the first sub-lens in a direction along an optical axis of the optical system in which the first sub-lens is located.

9. The assembly device for an optical assembly according to claim 6, wherein the second fixing mechanism has a second reference plane, and the second fixing mechanism includes an inclination angle adjusting mechanism, which is configured to adjust the second fixing mechanism in the degree of freedom in the v-direction and the w-direction, so that the second reference plane matches the first reference plane.

10. The assembly device for an optical assembly according to claim 9, wherein the position measuring assembly is further configured to measure the second reference plane of the second fixing mechanism, and the inclination angle adjusting mechanism is configured to adjust the second fixing mechanism based on a measurement result of the position measuring assembly, so that the second reference plane matches the first reference plane.

11. The assembly device for an optical assembly according to claim 6, wherein the first fixing mechanism has a third reference plane, and the first fixing mechanism includes an inclination angle adjusting mechanism, which is configured to adjust the first fixing mechanism in the degree of freedom in the v-direction and the w-direction, so that the third reference plane matches the first reference plane.

12. The assembly device for an optical assembly according to claim 11, wherein the first fixing mechanism further includes a rotation adjusting mechanism, configured to rotate the first fixing mechanism in a direction rotating about a rotation axis perpendicular to the third reference plane.

13. A method for assembling an optical lens based on the assembly device for an optical assembly according to claim 1, the method comprising the following steps:
- fixing the second sub-lens to the first fixing mechanism;
- grasping the first sub-lens and arranging the first sub-lens on an optical axis of the second sub-lens by the grasping mechanism, so as to form the optical system capable of imaging;
- changing relative positions of the first and second sub-lenses, measuring an imaging quality of the optical system at different relative positions, and finding the relative positions of the first and second sub-lenses that make the imaging quality reach a threshold, wherein the imaging quality of the optical system is obtained based on the image data acquired by the data acquiring assembly, and the image data acquired by the data acquiring assembly is from the photosensitive assembly fixed to the second fixing mechanism; and
- maintaining the relative positions of the first and second sub-lenses that make the imaging quality reach the threshold, and utilizing the material connecting assembly to fix the first and second sub-lenses together.

14. The method for assembling an optical lens according to claim 13, further comprising:
- prior to the step of finding the relative positions of the first and second sub-lenses that make the imaging quality reach the threshold, utilizing the material connecting assembly to apply glue on the first sub-lens and/or the second sub-lens,
- wherein, after the step of finding the relative positions of the first and second sub-lenses that make the imaging quality reach the threshold, performing the steps of maintaining the relative positions of the first and second sub-lenses that make the imaging quality reach the threshold, and utilizing the material connecting assembly to fix the first and second sub-lenses together.

15. The method for assembling an optical lens according to claim 14, wherein in the step of finding the relative positions of the first and second sub-lenses that make the imaging quality reach the threshold, taking measures to counteract sub-lens position shift caused by expansion or contraction of the glue during the curing process.

16. The method for assembling an optical lens according to claim 15, wherein
- the grasping mechanism has a force feedback clamping jaw,
- in the step of finding the relative positions of the first and second sub-lenses that make the imaging quality reach the threshold, the force feedback clamping jaw grips the first sub-lens with a first pressure, and
- in the step of utilizing the material connecting assembly to fix the first and second sub-lenses together, the force feedback clamping jaw grips the first sub-lens with a second pressure, and the second pressure is greater than the first pressure.

17. The method for assembling an optical lens according to claim 13, further comprising:
- after the step of finding the relative positions of the first and second sub-lenses that make the imaging quality reach the threshold, separating the first sub-lens from the second sub-lens, utilizing the material connecting assembly to apply glue on the first sub-lens and/or the second sub-lens, then re-arranging the first sub-lens on the optical axis of the second sub-lens, and performing the steps of maintaining the relative positions of the first and second sub-lenses that make the imaging quality reach the threshold, and utilizing the material connecting assembly to fix the first and second sub-lenses together.

18. A method for assembling a camera module based on the assembly device for an optical assembly according to claim 1, the method comprising the following steps:
fixing the second sub-lens to the first fixing mechanism;
fixing the photosensitive assembly to be assembled to the second fixing mechanism;
grasping the first sub-lens and arranging the first sub-lens on an optical axis of the second sub-lens by the grasping mechanism, so as to form the optical system capable of imaging;
changing relative positions of the first sub-lens, the second sub-lens, and the photosensitive assembly to be assembled, and measuring imaging quality of the optical system at different relative positions, then finding the relative positions of the first and second sub-lenses, and the relative positions of the second sub-lens and the photosensitive assembly to be assembled that make the imaging quality reach a threshold, wherein the imaging quality of the optical system is obtained based on the image data acquired by the data acquiring assembly, and the image data acquired by the data acquiring assembly is from the photosensitive assembly to be assembled;
maintaining the relative positions of the first and second sub-lenses that make the imaging quality reach the threshold, and utilizing the material connecting assembly to fix the first and second sub-lenses together; and
maintaining the relative positions of the second sub-lens and the photosensitive assembly to be assembled that make the imaging quality reach the threshold, and utilizing the material connecting assembly to fix the second sub-lens and the photosensitive assembly to be assembled together.

19. The method for assembling an optical lens according to claim 18, further comprising:
prior to the step of finding the relative positions of the first and second sub-lenses, and the relative positions of the second sub-lens and the photosensitive assembly to be assembled that make the imaging quality reach the threshold, utilizing the material connecting assembly to apply glue on the first sub-lens and/or the second sub-lens, and apply glue on the second sub-lens and/or the photosensitive assembly to be assembled,
wherein, after the step of finding the relative positions of the first and second sub-lenses, and the relative positions of the second sub-lens and the photosensitive assembly to be assembled that make the imaging quality reach the threshold, performing the steps of maintaining the relative positions of the first and second sub-lenses that make the imaging quality reach the threshold, and utilizing the material connecting assembly to cure the glue and fix the first and second sub-lenses together, and fix the second sub-lens and the photosensitive assembly to be assembled together.

20. The method for assembling an optical lens according to claim 18, further comprising:
after the step of finding the relative positions of the first and second sub-lenses, and the relative positions of the second sub-lens and the photosensitive assembly to be assembled that make the imaging quality reach the threshold, separating the first sub-lens from the second sub-lens, and separating the second sub-lens from the photosensitive assembly to be assembled, utilizing the material connecting assembly to apply glue on the first sub-lens and/or the second sub-lens, and apply glue on the second sub-lens and/or the photosensitive assembly to be assembled, then re-arranging the first sub-lens on the optical axis of the second sub-lens, performing the steps of maintaining the relative positions of the first and second sub-lenses, and the relative positions of the second sub-lens and the photosensitive assembly to be assembled that make the imaging quality reach the threshold, and utilizing the material connecting assembly to cure the glue and fix the first and second sub-lenses together, and fix the second sub-lens and the photosensitive assembly to be assembled together.

\* \* \* \* \*